April 2, 1963  O. MUELLER  3,083,590
TRANSMISSION
Filed July 14, 1960  2 Sheets-Sheet 1

INVENTOR.
Otto Mueller
BY
Barnes, Dickey & Pierce.
ATTORNEYS.

April 2, 1963   O. MUELLER   3,083,590
TRANSMISSION
Filed July 14, 1960   2 Sheets-Sheet 2

INVENTOR.
Otto Mueller.
BY
Barnes, Dickey & Pierce
ATTORNEYS.

United States Patent Office 3,083,590
Patented Apr. 2, 1963

3,083,590
TRANSMISSION
Otto Mueller, 13 Byfield Lane, Dearborn, Mich.
Filed July 14, 1960, Ser. No. 42,900
9 Claims. (Cl. 74—781)

This invention relates to transmissions, and particularly to a transmission of the planetary brake and clutch controlled type.

While transmissions of the planetary type are of themselves old in the art, the use of planetary gearing and brake and clutch devices provides a high speed, a low speed, and a no-drive position. A case is constantly driven by a drive shaft and a brake device at the drive end of the case maintains a sun gear stationary to cause the rotating case to drive through the planetary gearing to drive a driven shaft at a substantial reduction in speed. The speed of the driven shaft may be varied through the changing of the pinion and sun gear varying the diameter and the teeth thereof. When the brake device at the drive end is released and the clutch device at the driven end of the case is engaged, the case is locked to the driven shaft, and the drive shaft, the case, and the driven shaft operate at the input speed. Any type of drive means may be provided for rotating the shaft and the driven shaft may directly drive a device or drive a device through additional reduction means, such as a worm and worm wheel mechanism. When both devices are released, the connection between the drive and driven shafts is interrupted, and the drive shaft no longer operates the driven shaft.

Accordingly, the main objects of the invention are: to provide a transmisison with planetary gearing and brake and clutch devices which produces a positive drive at high and low speeds; to provide a transmission of the planetary gearing type employing a case which is directly connected to the drive shaft to be operated at all times therewith at intake speed and at a substantially reduced speed; to provide a driven case with planetary gearing and a pair of engaging and releasing devices for retaining a sun gear stationary to cause a drive through the planetary gearing at reduced speed or for directly connecting the case to a driven shaft when the sun gear is released, and, in general, to provide a transmission for producing a high and low speed drive and a no-drive position which is simple in construction, positilve in operation and economical to manufacture.

Other objects and features of novelty of the invention will be specifically pointed out or will become apparent when referring, for a better understanding of the invention, to the following description taken in conjunction with the accompanying drawings, wherein.

Figure 1:
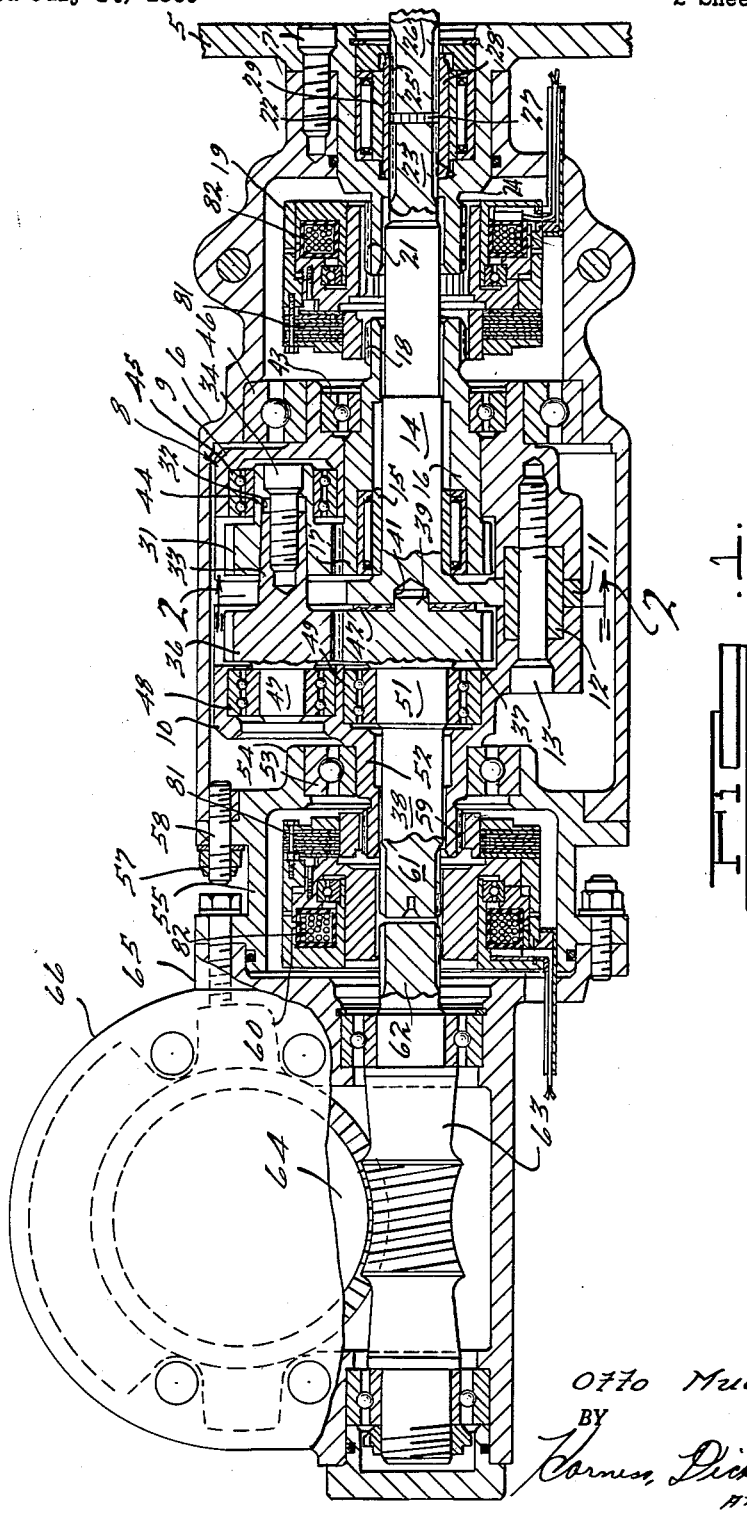
FIGURE 1 is a broken sectional view of a transmission embodying features of the present invention.
Figure 2:
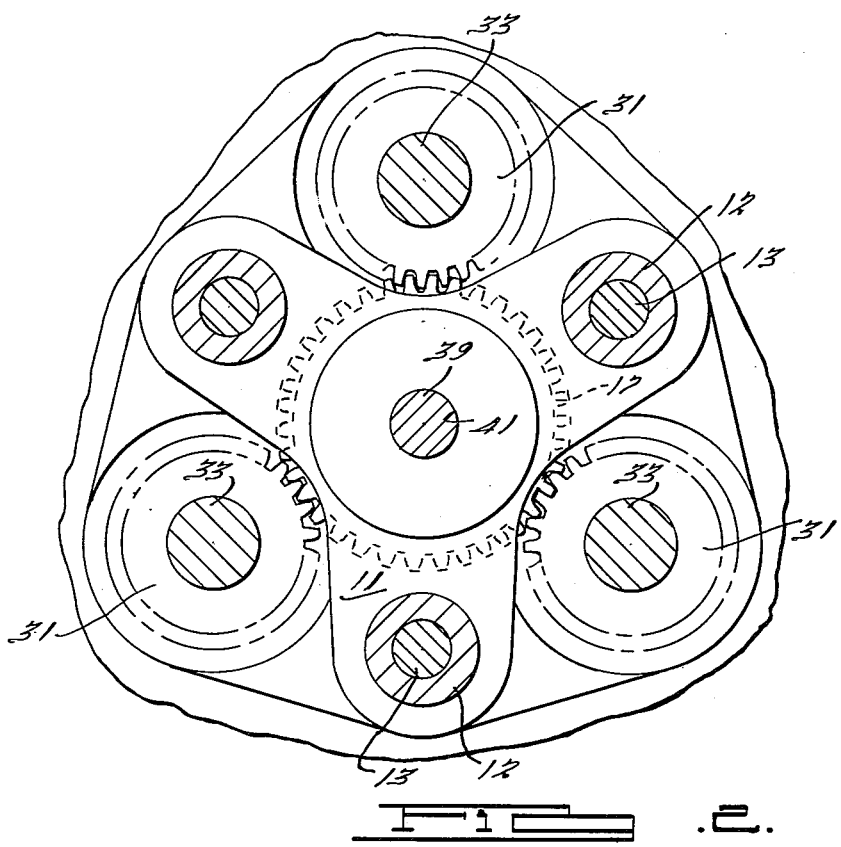
FIG. 2 is an enlarged, sectional view of the structure illustrated in FIG. 1, taken on the line 2—2 thereof.

The transmission of the present invention comprises a stationary frame 5 having a housing 6 fixedly secured thereto by a plurality of screws 7. A case 8 has a rear section 9 and a forward section 10 spaced apart by a central web 11 and maintained in aligned relation by bushing 12 and screws 13 which extend through the casing portions and the bushing. The web 11 is a fixed part of a drive shaft 14 supported by a roller or like bearing 15 within a sleeve 16 having a sun gear 17 on its forward end and a splined collar 18 on its rearward end. The collar 18 is secured in a rotatable portion of a brake device 19 which is herein illustrated as of the solenoid operated type although various types of brake and clutch devices may be employed, such as mechanical, electrical, fluid and the like, the particular type of brake device forming no part of the present invention. The stationary portion of the brake device 19 is fixed to a splined sleeve 21 on a hollow boss 22 extending forwardly from the stationary frame 5. A plurality of disks 81, which are alternately attached to the fixed and movable brake portions of the device, are retained in unit driving relation when a coil 82 is energized to supply flux to the fixed portion of the device. The driven end 23 of the drive shaft 14 has splines 24 thereon which are aligned with splines 25 on a drive shaft 26 of a motor or other propelling means. The splines 24 and 25 are engaged with the grooves of the splines 27 of a bushing 28 which locks the adjacent ends of the shafts 14 and 26 in fixed relation to each other. The bushing 28 is supported in a roller or other type of bearing 29. When the rotary portion of the brake device 19 is fixed relative to the fixed portion thereof, the collar 18 is retained fixed relative to the stationary collar 21 and the sun gear 17 is fixed against rotation.

Three planet gears 31 are spaced 120° apart and have teeth engaging the teeth of the sun gear, the planet gears having an internal tapered recess 32 engaging tapered bosses 33 which secure the planet gears 31 in fixed relationship thereto when forced thereon by screws 34. The bosses 33 extend from a second set of pinion gears 36 which are retained in fixed relation to the planet gears 31 to rotate therewith. The pinions 36 drive a sun gear 37 at the end of a driven shaft 38. The gear 37 has a rearwardly extending central stub shaft 39 which projects within a central aperture 41 in the end of the drive shaft 14 through a low friction washer 42. The washer 42 abuts adjacent faces of the gear 37 and the web portion 11 at the end of the shaft 14. The sleeve 16 is supported intermediate the bearing 15 and a sleeve 18 by a roller or like bearing 43.

A rearwardly extending boss 44 on the planet gears 31 is secured by a bearing 45 to the forward portion of the rear section 9 of the case 8, the latter being supported on the stationary housing 6 by a bearing 46 disposed radially outward of the bearing 43. The planet gears 36 have a stub shaft 47 forwardly thereof which is secured by a bearing 48 to the rearward portion of the forward section 10 of the case 8 which also supports a central roller or like bearing 49 for engaging an enlarged portion 51 of the driven shaft 38. A forwardly extending sleeve portion 52 of the case section 10 is supported by a rollerlike bearing 53 to a boss 54 of a closure member 55 for the forward end of the stationary housing 6, being secured thereto by nuts 57 on studs 58 provided at the end of the casing. A splined sleeve 59 at the forward end of the forward section 10 of the casing 8 is connected to the rotatable part of a clutch device 60, the fixed portion of which has a splined connection to the forward splined end 61 of the driven shaft 38 and to the adjacent splined end 62 of a worm 63 to have the driven shaft 38 in fixed relation at all times with the worm 63. The clutch device 60 is of the same construction as the brake device 19 having disks 81 and a coil 82.

The worm 63 has its thread disposed in engagement with the teeth of a worm wheel 64 to show a reduction drive which further reduces the speed through the transmission. The closure element 55 is sealed to the end of a collar 65 on a housing 66 of the worm and worm wheel drive, permitting the use of a common lubricant in the worm and the transmission housing. It is to be understood that the worm and worm wheel drive form no part of the present invention and that the transmission may be employed to drive any device directly or through other reduction drive devices.

When the drive shaft 14 is rotated by the shaft 26, the web 11 will drive the case 8 in rotation, carrying the sun and planet gears 31 along therewith. If neither of the devices 19 and 60 is energized, no drive will be produced to the worm 63 as the case 8 will merely rotate within the housing 6. If a slow speed drive is desired, the brake device 19 is energized to lock the collar 18 to the splined sleeve 21 and retain the sun gear 17 in fixed relation to the case 6. The planet gears 31 will rotate about the sun gear 37, rotating the pinions 36 to drive the sun gear 37 and the driven shaft 38 to thereby drive the worm 63 as the adjacent ends 61 and 62 thereof are in fixed relation to each other within the clutch device 60. If it is desired to drive the worm 63 at high speed, the brake device 19 is de-energized and the clutch device 60 is energized to thereby lock the collar 59 to the shaft ends 61 and 62 and cause the case 8 to directly drive the worm 63 at the same speed as the shaft 26. By de-energizing both of the devices 19 and 60, the drive through the transmission is interrupted.

If in the present arrangement the sun gear 17 has thirty teeth, the planet gear 31 has twenty-two teeth, the planet gear 36 has twenty-five teeth, and the sun gear 37 has thirty-five teeth, a reduction of 38.5–1 is produced. It is to be understood that by changing the size of the gears and the number of teeth thereof a substantial change in the reduction of speed from direct drive may be produced. It is to be understood that the transmission is not limited to the relationship of the gears and the number of teeth herein mentioned, as the number of teeth are given by way of example and are not limiting.

Figure 3:
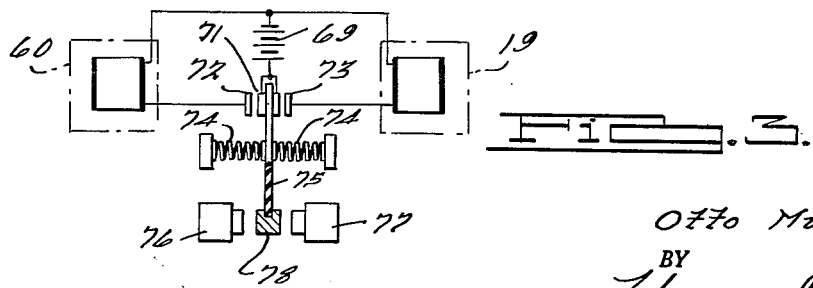
FIG. 3 is a schematic diagram illustrating the interlocking control system for the transmission of the present invention.

An interlocking arrangement is illustrated in FIG. 3 for electrically energizing the coils 82 of the devices 19 and 60 of a type well known in the art. A battery 69 provides current to the coils 82 of the devices by a contact 71 when engaging either of the contacts 72 and 73. A pair of springs 74 on each side of an arm 75 maintains the contact 71 centrally between the contacts 72 and 73 to thereby have both of the solenoids of the devices 19 and 60 de-energized. A pair of solenoids 76 and 77 are spaced from an armature 78 on the end of the arm 75 for moving the arm and the contact 71 into engagement with either of the contacts 72 and 73 when either of the coils 76 and 77 is energized. The coils 82 of the devices 19 and 60 are de-energized when the contact 71 is spaced from the contacts 72 and 73. With this arrangement, only one of the coils 82 of the devices can be energized at one time through the movement of the contact 71 to the right or the left, so that it is impossible to have both of the devices energized at the same time. The position of the contacts is such as to produce an interlocking arrangement so that neither of the devices can be energized until the other one has been de-energized. An arrangement could be made whereby both coils 82 of the devices are energized at the same time to thereby have the low and high speed drive engaged at the same time. This will positively prevent any of the gears or shafts from being driven and provide a lock to the drive through the mechanism. This could be accomplished by connecting the battery 69 simultaneously to the contacts 72 and 73.

What is claimed is:

1. In a transmission, a supporting member having a forwardly extending sleeve thereon containing a splined collar, a housing extending over said sleeve and sealed to said supporting member when secured thereto, a drive shaft having a splined end aligned with a splined end of a rotatable drive member and fixed to each other by a splined bushing extending thereover, a bearing disposed between the inner portion of said sleeve and said splined bushing, the forward end of said drive shaft having a web thereon, a case joined to said web for rotation with said drive shaft, a sun gear having an internal bearing secured to said drive shaft and a sleeve portion rearwardly thereof terminating in a splined collar disposed in aligned relation to the collar on said fixed member, a brake device attached to said collar on said supporting member and having a rotatable portion engaging the collar on said sun gear, a bearing on the sleeve of the sun gear engaging the rearward end of said case which is supported by a bearing to the inner surface of said housing, two sets of joined planet gears supported within the case with one set of planet gears in mesh with said sun gear, a driven shaft having a sun gear thereon in mesh with the other set of planet gears, the forward portion of the case having a splined sleeve which is supported by a bearing to the forward end of the housing, and a clutch device in the forward end of said housing, the rotatable part of said clutch device being secured to the splined sleeve of said case the fixed portion of which is secured to the driven shaft.

2. In a transmission, a supporting member having a forwardly extending sleeve thereon containing a splined collar, a housing extending over said sleeve and sealed to said supporting member when secured thereto, a drive shaft having a splined end aligned with a splined end of a rotatable drive member and fixed to each other by a splined bushing extending thereover, a bearing disposed between the inner portion of said sleeve and said splined bushing, the forward end of said drive shaft having a web thereon, a case joined to said web for rotation with said drive shaft, a sun gear having an internal bearing secured to said drive shaft and a sleeve portion rearwardly thereof terminating in a splined collar disposed in aligned relation to the collar on said fixed member, a brake device attached to said collar on said supporting member and having a rotatable portion engaging the collar on said sun gear, a bearing on the sleeve of the sun gear engaging the rearward end of said case which is supported by a bearing to the inner surface of said housing, two sets of joined planet gears supported within the case with one set of planet gears in mesh with said sun gear, a driven shaft having a sun gear thereon in mesh with the other set of planet gears, the forward portion of the case having a splined sleeve which is supported by a bearing to the forward end of the housing, a clutch device in the forward end of said housing, the rotatable part of said clutch device being secured to the splined sleeve of said case the fixed portion of which is secured to the driven shaft, and means for operating either of the devices when the other is inoperative for connecting the case directly to the driven shaft to produce a direct drive when one device is operated and to connect the first said sun gear to the housing for causing the driven shaft to be operated at a reduced speed when the other device is operated.

3. In a transmission, a supporting member having a forwardly extending sleeve thereon containing a splined collar, a housing extending over said sleeve and sealed to said supporting member when secured thereto, a drive shaft having a splined end aligned with a splined end of a rotatable drive member and fixed to each other by a splined bushing extending thereover, a bearing disposed between the inner portion of said sleeve and said splined bushing, the forward end of said drive shaft having a web thereon, a case joined to said web for rotation with said drive shaft, a sun gear having an internal bearing secured to said drive shaft and a sleeve portion rearwardly thereof terminating in a splined collar disposed in aligned relation to the collar on said fixed member, a brake device attached to said collar on said supporting member and having a rotatable portion engaging the collar on said sun gear, a bearing on the sleeve of the sun gear engaging the rearward end of said case which is supported by a bearing to the inner surface of said housing, two sets of joined planet gears supported within the case with one set of planet gears in mesh with said sun gear, a driven shaft having a sun gear thereon in mesh with the other set of planet gears, the forward portion of the case having a splined sleeve which is supported by a bearing to the forward end of the housing, a clutch device in the forward end of said housing, the rotatable part of said clutch device being secured to the splined sleeve of said case the fixed portion of which is secured to the driven shaft, means for operating either of the devices when the other is inoperative for connecting the case directly to the driven shaft to produce a direct drive when one device is operated and to connect the first said sun gear to the housing for causing the driven shaft to be operated at a reduced speed when the other device is operated, and means for interlocking the device operating means to permit either one to be operated only after the other is inoperative.

4. In a transmission, a supporting member having a forwardly extending sleeve thereon containing a splined collar, a housing extending over said sleeve and sealed to said supporting member when secured thereto, a drive shaft having a splined end aligned with a splined end of a rotatable drive member and fixed to each other by a splined bushing extending thereover, a bearing disposed between the inner portion of said sleeve and said splined bushing, the forward end of said drive shaft having a web thereon, a case joined to said web for rotation with said drive shaft, a sun gear having an internal bearing secured to said drive shaft and a sleeve portion rearwardly thereof terminating in a splined collar disposed in aligned relation to the collar on said fixed member, a brake device attached to said collar on said supporting member and having a rotatable portion engaging the collar on said sun gear, a bearing on the sleeve of the sun gear engaging the rearward end of said case which is supported by a bearing to the inner surface of said housing, two sets of joined planet gears supported within the case with one set of planet gears in mesh with said sun gear, a driven shaft having a sun gear thereon in mesh with the other set of planet gears, the forward portion of the case having a splined sleeve which is supported by a bearing to the forward end of the housing, a clutch device in the forward end of said housing, the rotatable part of said clutch device being secured to the splined sleeve of said case the fixed portion of which is secured to the driven shaft, means for operating either of the devices when the other is inoperative for connecting the case directly to the driven shaft to produce a direct drive when one device is operated and to connect the first said sun gear to the housing for causing the driven shaft to be operated at a reduced speed when the other device is operated, means for interlocking the device operating means to permit either one to be operated only after the other is inoperative, and means for retaining both of the devices inoperative to thereby interrupt the drive through the transmission.

5. In a transmission, a first shaft, a second shaft in aligned axial relation to said first shaft, a rotatable case having forward and rearward sections, means connecting said first shaft to said case in direct drive relation therewith, a first set of planet gears, a second set of planet gears, the diameters of the planet gears of each set being the same and the diameters of one set being different from the diameters of the other set, a gear of each set being connected in pairs in aligned axial relation, said connected pairs of planet gears being rotatably carried by said forward and rearward sections of said rotatable case, a sun gear in mesh with one set of planet gears, a brake for locking and releasing said sun gear, a second sun gear fixed to said second shaft with the teeth in mesh with the teeth of the other set of planet gears, a sleeve encircling said second shaft and coupled to said rotatable case in direct drive relation therewith, and a clutch means for locking and releasing said sleeve to said second shaft.

6. In a transmission, a first shaft, a second shaft in aligned axial relation to said first shaft, a rotatable case having forward and rearward sections, means connecting said first shaft to said case in direct drive relation therewith, a first set of planet gears, a second set of planet gears, the diameters of the planet gears of each set being the same and the diameters of one set being different from the diameters of the other set, a gear of each set being connected in pairs in aligned axial relation with a stub shaft extending at each end and bearings within said case to support said stub shafts, said connected pairs of planet gears being rotatably carried by said forward and rearward sections of said rotatable case, a sun gear in mesh with one set of planet gears, a brake for locking and releasing said sun gear, a second sun gear fixed to said second shaft with the teeth in mesh with the teeth of the other set of planet gears, a sleeve encircling said second shaft and coupled to said rotatable case in direct drive relation therewith, and a clutch means for locking and releasing said sleeve to said second shaft.

7. In a transmission, a first shaft, a second shaft in aligned axial relation to said first shaft, a rotatable case having forward and rearward sections, means connecting said first shaft to said case in direct drive relation therewith, a first set of planet gears, a second set of planet gears, the diameters of the planet gears of each set being the same and the diameters of one set being different from the diameters of the other set, a gear of each set being connected in pairs in aligned axial relation, said connected pairs of planet gears being rotatably carried by said forward and rearward sections of said rotatable case, a sun gear in mesh with one set of planet gears, a brake for locking and releasing said sun gear, a second sun gear fixed to said second shaft with the teeth in mesh with the teeth of the other set of planet gears, a sleeve encircling said second shaft and coupled to said rotatable case in direct drive relation therewith, a clutch means for locking and releasing said sleeve to said second shaft, a housing disposed about said rotatable case and shafts, and bearing means within the housing rotatably supporting the shafts and case therewithin.

8. In a transmission, a first shaft, a second shaft in aligned axial relation to said first shaft, a rotatable case having forward and rearward sections, means connecting said first shaft to said case in direct drive relation therewith, a first set of planet gears, a second set of planet gears, the diameters of the planet gears of each set being the same and the diameters of one set being different from the diameters of the other set, a gear of each set being connected in pairs in aligned axial relation, said connected pairs of planet gears being rotatably carried by said forward and rearward sections of said rotatable case, a sun gear in mesh with one set of planet gears, a brake for locking and releasing said sun gear, a second sun gear fixed to said second shaft with the teeth in mesh with the teeth of the other set of planet gears, a sleeve encircling said second shaft and coupled to said rotatable case in direct drive relation therewith, a clutch means for locking and releasing said sleeve to said second shaft, a housing disposed about said rotatable case and shafts, bearing means within the housing rotatably supporting the shafts and case therewithin, and means extending through said housing for locking and releasing said brake and said clutch means.

9. In a transmission, a first shaft, a second shaft in aligned axial relation to said first shaft, a rotatable case having forward and rearward sections, means connecting said first shaft to said case in direct drive relation therewith, a first set of planet gears, a second set of planet gears, the diameters of the planet gears of each set being the same and the diameters of one set being different from the diameters of the other set, a gear of each set being connected in pairs in aligned axial relation, said connected pairs of planet gears being rotatably carried by said forward and rearward sections of said rotatable case, a sun gear in mesh with one set of planet gears, a brake for locking and releasing said sun gear, a second sun gear fixed to said second shaft with the teeth in mesh with the teeth of the other set of planet gears, a sleeve encircling said second shaft and coupled to said rotatable case in direct drive relation therewith, a clutch means for locking and releasing said sleeve to said second shaft, a housing disposed about said rotatable case and shafts, bearing means within the housing rotatably supporting the shafts and case therewithin, and bearing means for supporting opposite ends of the rotatable case within the housing.

References Cited in the file of this patent

UNITED STATES PATENTS

| | | |
|---|---|---|
| 1,834,322 | Thornhill | Dec. 1, 1931 |
| 2,533,056 | Selby | Dec. 5, 1950 |
| 2,922,314 | Johnson et al. | Jan. 26, 1960 |